United States Patent

[11] 3,609,403

[72] Inventor Edwin R. Eberle
Great Neck, N.Y.
[21] Appl. No. 773,523
[22] Filed Nov. 5, 1968
[45] Patented Sept. 28, 1971
[73] Assignee Consolidated Edison Company of New York, Inc.
New York, N.Y.

[54] RATE OF CHANGE OF FREQUENCY GENERATOR
16 Claims, 5 Drawing Figs.

[52] U.S. Cl. .......... 307/261, 307/229, 307/271, 328/13, 328/22, 328/27, 328/36
[51] Int. Cl. .......... H03k 5/00
[50] Field of Search .......... 307/229, 261, 268, 271; 328/13, 14, 22, 27, 36, 59; 331/57, 60, 61, 47, 48

[56] References Cited
UNITED STATES PATENTS

| | | | |
|---|---|---|---|
| 3,340,476 | 9/1967 | Thomas et al. .......... | 307/261 X |
| 3,350,651 | 10/1967 | Davis .......... | 328/22 X |
| 3,370,180 | 2/1968 | Halverson et al. .......... | 307/238 |
| 3,191,071 | 6/1965 | King et al. .......... | 307/271 X |
| 3,422,372 | 1/1969 | Post et al. .......... | 331/47 X |

*Primary Examiner*—Stanley D. Miller, Jr.
*Attorney*—Brooks, Haidt & Haffner

ABSTRACT: The voltage from a ramp generator, under the control of a control circuit, is superimposed upon an adjustable base frequency selecting voltage and utilized to control the time delay afforded by one stage of a 2-stage ring-type oscillatory system. The second stage provides a fixed time interval which when added to the delay provided by the first stage determines the period of one-half cycle of the desired output signal. The asymmetric signals from the oscillatory circuit control a bistable flip-flop whose symmetrical output is filtered to provide a sinusoidal test signal.

INVENTOR.
EDWIN R. EBERLE
BY
Ward, McElhannon, Brooks & Fitzpatrick
ATTORNEYS

INVENTOR.
EDWIN R. EBERLE
BY
Ward, McElhannon, Brooks & Fitzpatrick
ATTORNEYS

INVENTOR.
EDWIN R. EBERLE
BY
Ward, McElhannon, Brooks & Fitzpatrick
ATTORNEYS

INVENTOR.
EDWIN R. EBERLE
BY
Ward, McElhannon, Brooks & Fitzpatrick
ATTORNEYS

RATE OF CHANGE OF FREQUENCY GENERATOR

DISCLOSURE

The present invention relates to a signal generator, and more particularly to a test generator source of substantially undistorted sinusoidal voltage of controllable frequency.

In an electric power generating system excessive deviation in frequency or sudden change therein is generally indicative of a potentially dangerous condition. Such conditions can be detected by suitable relays which can cut out appropriate portions of the system prior to catastrophic failure. It is necessary, however, both in the design of such relays and in the subsequent testing thereof, to have available a suitable standard signal source for simulating the field conditions. It is the purpose of the present invention to provide such a generator.

A satisfactory frequency sensitive relay must be arranged to trip if the frequency drops below a predetermined value or drops at an excessive rate. Therefore, in accordance with the present invention there is provided a signal generator comprising in combination means for generating a nonsinusoidal signal wave having a recognizable characteristic recurring at a controllable repetition rate, means coupled to the generating means for varying the repetition rate in accordance with a preselected schedule, and means coupled to the generating means for converting the nonsinusoidal wave to a sinusoidal wave having a frequency determined by the repetition rate.

Figure 1:
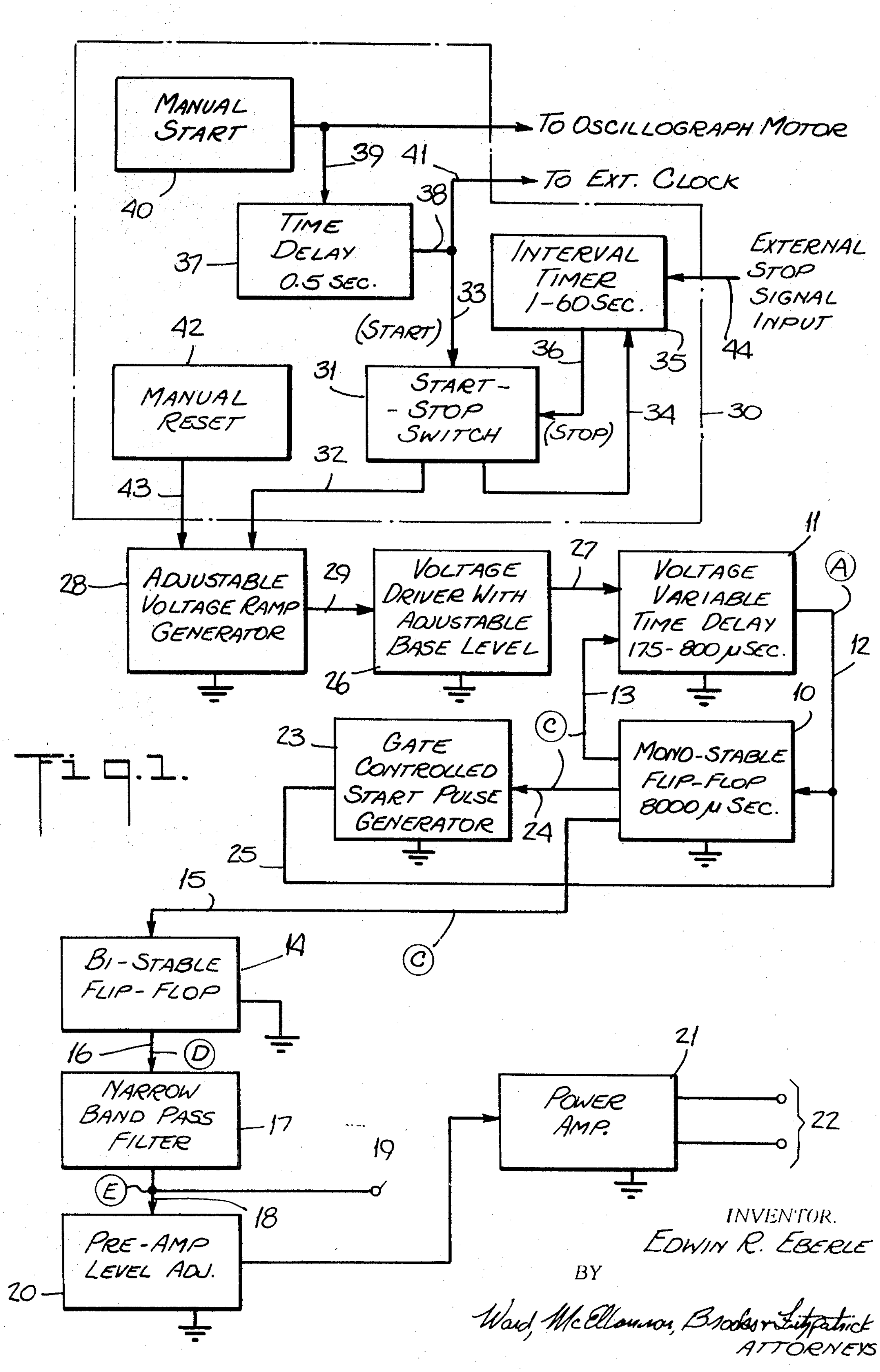
Figure 2A:
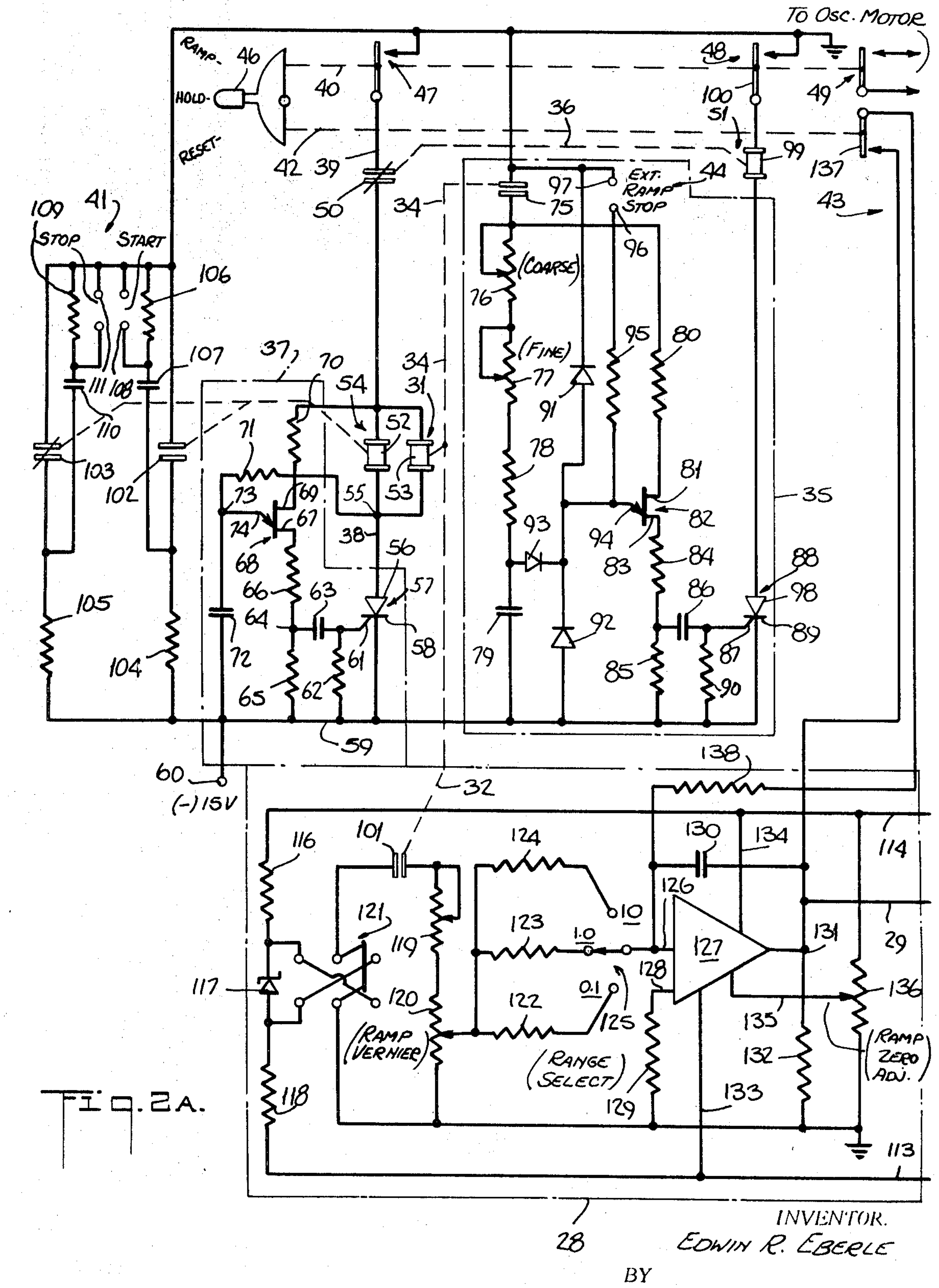
Figure 2B:
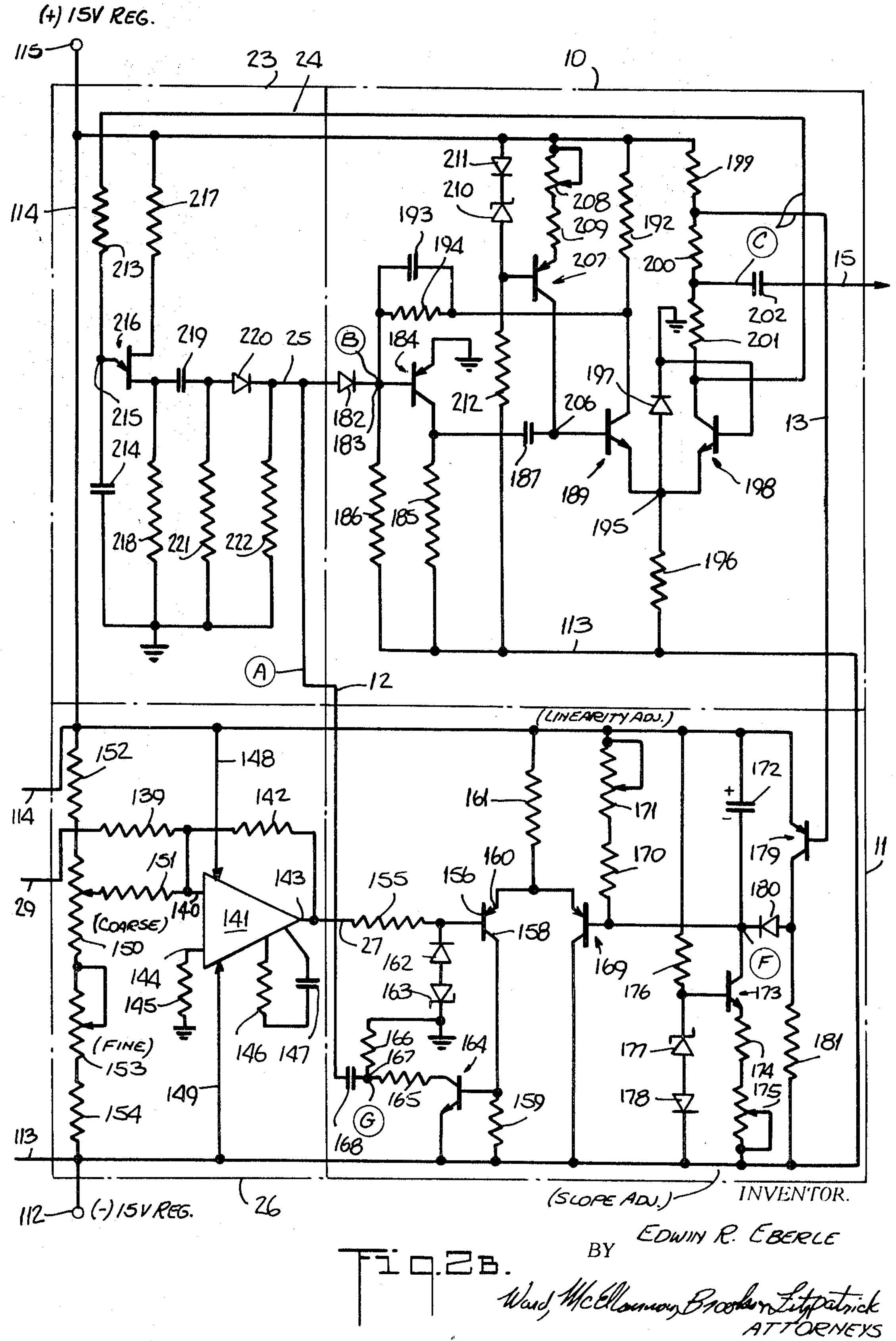
Figure 3B:
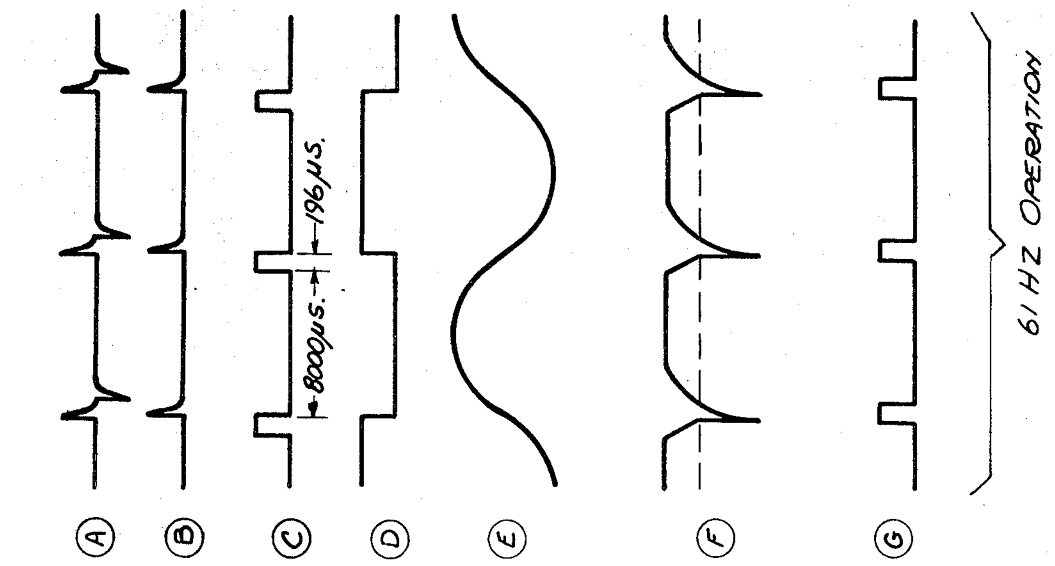
Figure 3A:
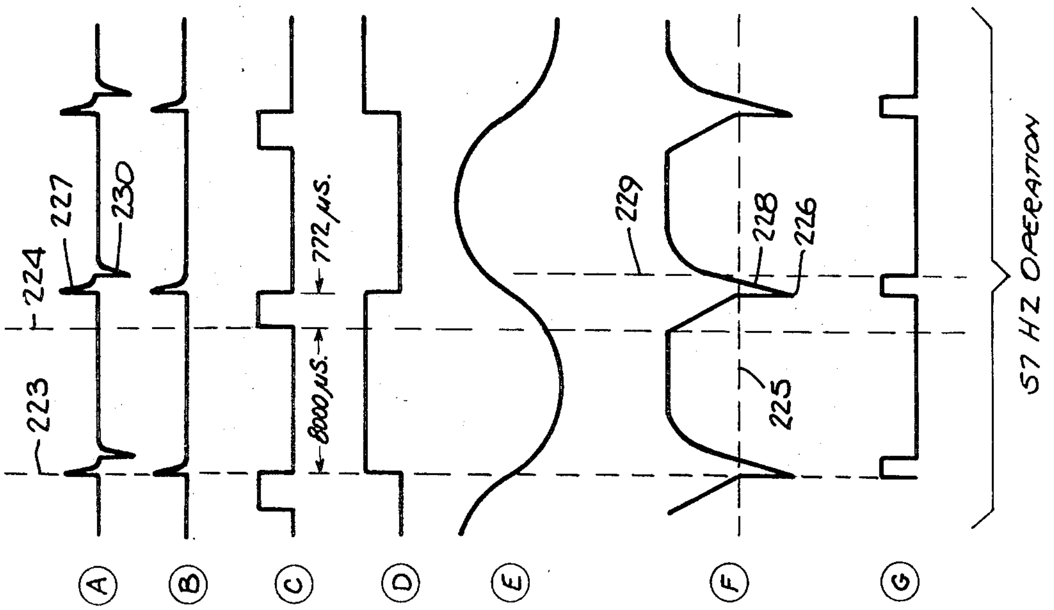

The invention will be better understood after reading the following detailed description of a presently preferred embodiment thereof with reference to the appended drawings in which:

FIG. 1 is a block diagram of the signal generator;

FIGS. 2A and 2B constitute a schematic circuit diagram of a portion of the system of FIG. 1; and FIGS. 3A and 3B present a series of curves showing waveforms at various points in the system of FIGS. 1 and 2 for a 57 Hz. and 61 Hz. output, respectively.

Throughout the drawings the same reference numerals are used to designate the same or similar parts.

Referring now to FIG. 1, the generating means comprises a monostable circuit 10 having an unstable state of substantially fixed duration. For a generator having an output covering the range from 57 Hz. to 61 Hz., the duration of the unstable condition of circuit 10 may be 8,000 microseconds. In addition, the generating means comprises a variable time delay circuit 11 having a delay range of from about 175 to about 800 microseconds. The two circuits 10 and 11 are coupled in a closed loop with the delayed output from the time delay circuit being fed by way of the connection 12 to the monostable circuit 10 for switching the latter to its unstable state, and the output from the monostable circuit 10 being fed over a connection 13 to an input to the time delay circuit 11. The arrangement, as will appear more clearly from the description below of the circuitry with reference to FIGS. 2A and 2B, is such that a delay cycle through the time delay circuit is initiated upon the return of the monostable circuit 10 to its stable state. Collectively, the circuits 10 and 11 constitute an oscillatory circuit producing a nonsinusoidal signal wave having a recognizable characteristic recurring at a repetition rate twice the frequency of the desired sinusoidal test signal.

In order to convert the output from the generating means to a sinusoidal wave there is provided a bistable flip-flop circuit 14 which is coupled by the connection 15 to an output from the monostable circuit 10, as seen in FIG. 1. The bistable circuit will provide at its output an alternating voltage wave, in this case a square wave, having symmetrical positive and negative half cycles of equal duration and a frequency equal to one-half of the repetition rate of the signal wave produced by the circuits 10 and 11. The square wave output from the circuit 14 is fed through a connection 16 to a narrow band-pass filter 17 which functions as a wave-shaping means for producing at its output 18 a substantially undistorted sinusoidal voltage. This voltage may be utilized directly by means of a terminal 19 or it may be fed through a preamplifier and level adjusting circuit 20 to a power amplifier 21 from which it is supplied to the terminals 22.

The oscillatory circuit consisting of monostable flip-flop circuit 10 and voltage variable time delay circuit 11 is not necessarily self-starting. Therefore, there is provided a gate-controlled start pulse generator 23 having an input for suppressing its operation which is connected over the path 24 to an output from the monostable circuit 10. The output from the pulse generator 23 is connected over a path 25 to the input of the monostable circuit 10 whereby actuation of the monostable circuit by the pulse generator occurs in the absence of a signal from the time delay circuit to switch the monostable circuit to its unstable state. Thereafter, oscillatory operation will be self-sustaining.

In order to vary the repetition rate of the signal produced by the monostable circuit 10 in conjunction with the time delay circuit 11 there is coupled to the latter through a connection 27 a voltage driver 26 with means for adjusting the base level. The voltage driver 26 is fed, in turn, with a variable voltage from an adjustable voltage ramp generator 28 over a path 29. Collectively, the circuits 26 and 28 provide a source of voltage over the connection 27 which is variable in a selectable direction at a selectable rate from a given datum level. The variable time delay circuit 11 is responsive to said voltage for varying its time delay.

To provide control of the source of voltage produced by circuits 26 and 28, there is provided a control circuit shown included within the broken line box 30. The control circuit 30 includes means for both initiating and interrupting operation of the ramp generator 28 from one voltage level to another. This takes the form of a start/stop switch 31 having its output connected over path 32 to an input of the voltage ramp generator 28. The start function controlled by the start/stop switch is commenced by applying a signal to the switch 31 over a path 33. At the same time, the start/stop switch applies a control signal over a path 34 to an interval timer 35 to commence a timing cycle thereof. The interval timer is arranged to provide an output from 1 to 60 seconds after receipt of an input over path 34. The output from the interval timer is fed over a path 36 to the switch 31 to impart a stop function thereto.

The signal for supplying the start function to the switch 31 is obtained from a time delay circuit 37 over its output path 38. The time delay circuit 37 has a delay, preferably, of about 0.5 seconds which is initiated by receipt of a signal over the path 39 from a manual start member 40.

It will also be seen from FIG. 1 that an output from the manual start member 40 is supplied to an oscillograph or recorder motor (not shown). As will appear more clearly hereinafter, upon manipulating the manual start member 40, the oscillograph motor is energized and allowed the half-second interval provided by the time delay circuit 37 for attaining normal operating speed before commencement of a variable frequency test cycle. As an accurate check on the interval provided by the interval timer 35, the signal at the output of the time delay circuit 37 may be supplied to an external clock via the connection 41. A manual reset member 42 is provided having a connection 43 coupling it to another input of the adjustable ramp generator 28. Finally, an input 44 is provided for applying an external stop signal to the interval timer 35.

The capital letters associated with the various connections on FIG. 1 correspond to the similarly designated wave shapes in FIGS. 3A and 3B. Further reference will be had to the applicable wave shapes after considering the description and operation of the detailed circuitry in FIGS. 2A and 2B to which attention is now directed. When FIGS. 2A and 2B are aligned side by side they constitute a single schematic which will be referred to generically hereinafter as "FIG. 2."

A toggle-type manual function switch lever 46 when manipulated to the "ramp" position functions to close by way of the connection 40 a series of switches 47, 48 and 49. The switch 49 completes an external circuit to the oscillograph motor. The switch 47 completes a circuit from the point of reference potential or ground through the connection 39 and the normally closed contacts 50 of relay 51 to the windings 52 and 53 of relays 54 and 31, respectively. The opposite terminals of the windings 52 and 53 are joined at a junction 55 to the connection 38 by which they are connected to the anode 56 of a silicon-controlled rectifier (SCR) 57. The cathode 58 of the rectifier 57 is connected to a bus 59 supplied with minus 15 volts from a terminal 60. The gate electrode 61 of the rectifier 57 is connected through a resistor 62 to the bus 59 and through a capacitor 63 to the junction 64 between a resistor 65 and a resistor 66. The resistor 65 is joined to the bus 59 while the resistor 66 connects the junction 64 to base contact 67 of a unijunction transistor 68. The other base contact 69 of the unijunction transistor 68 is connected through a resistor 70 to the junction between the windings 52 and 53 and the relay contacts 50. A resistor 71 is connected in series with a capacitor 72 between the junction 55 and the bus 59. The junction 73 between the resistor 71 and capacitor 72 is connected to the emitter contact 74 of the unijunction transistor 68.

Relay 31 has a first pair of normally open contacts 75 interposed between ground and a first adjustable resistor 76. The free end of resistor 76 is joined to a second adjustable resistor 77 which is connected through a fixed resistor 78 in series with a capacitor 79 to the negative bus 59.

The junction between contacts 75 and resistor 76 is connected through a resistor 80 to a base contact 81 of a unijunction transistor 82. The other base contact 83 of the unijunction transistor 82 is connected through resistor 84 and resistor 85, in series, to the negative bus 59. The junction between resistors 84 and 85 is connected through a capacitor 86 to the gate contact 87 of an SCR device 88. The cathode 89 of the device 88 is connected to the bus 59. A resistor 90 is connected to the junction between the capacitor 86 and the gate 87, on the one hand, and to the negative bus 59 on the other hand. A series of rectifiers 91 and 92, poled as shown, is connected between the negative bus 59 and ground. The junction between rectifiers 91 and 92 is connected through another rectifier 93 to the junction between resistor 78 and capacitor 79. The junction between rectifiers 91 and 92 is also connected to the emitter electrode 94 of the transistor 82 and through a resistor 95 to a terminal 96 of the external ramp stop input 44. The second terminal 97 of the input 44 is connected to ground, as shown. Finally, the anode 98 of the SCR 88 is connected through a winding 99 of the relay 51 to the movable armature 100 of the switch 48. Relay 31 is also provided with another pair of normally open contacts 101 for a purpose which will be described below.

Relay 54 has two pairs of contacts, the first being the normally open contacts 102 and the second pair being the normally closed contacts 103. The contacts 102 are connected in series with a resistor 104 between the negative bus 59 and ground. In similar manner, the contacts 103 are connected in series with the resistor 105 between the bus 59 and ground. Connected across the contacts 102 are the resistor 106 and capacitor 107 in series. A pair of output terminals 108 for providing an output start signal is connected across the resistor 106. Across the contacts 103 there are connected the resistor 109 and capacitor 110 in series. A pair of output terminals 111 for providing an output stop signal is connected across the resistor 109.

The portion of FIG. 2 which has been described to this point represents the control circuit shown within the outline box 30 of FIG. 1. The 15-volt source for energizing this portion of the circuit may be unregulated, if desired. However, the remaining circuitry now to be described requires a well-regulated power supply for stable operation. A minus 15-volt regulated source can be connected by way of terminal 112 to a negative bus 113. A positive bus 114 is supplied from a terminal 115 with a regulated plus 15 volts.

Considering the ramp generator 28, a voltage divider consisting of a resistor 116 connected in series with a zener diode 117 and another resistor 118 is connected between the positive bus 114 and the negative bus 113. A circuit including the adjustable resistor 119 connected in series with a potentiometer 120 and the relay contacts 101 is coupled across the zener diode 117 through a reversing switch 121. The slider of potentiometer 120 is connected through a series of three range selection resistors 122, 123 and 124 to corresponding fixed contacts of a range selector switch 125. The armature of switch 125 is connected to an input, 126, of an operational amplifier 127. A second input, 128, of the amplifier 127 is connected through a resistor 129 to one end of the potentiometer 120 and to ground, as shown. The operational amplifier 127 is connected in a classical integrating circuit by coupling a capacitor 130 from its output 131 to its input terminal 126. A resistor 132 is connected from the output 131 to ground. Connection to the negative bus 113 is obtained by a lead 133 while connection to the positive bus is provided by the connection 134. An adjustment for the level of the output is provided by the connection 135 to the slider of a potentiometer 136 which is coupled between the positive bus 114 and ground. The manual reset member 42 in the control circuit controls a switch 137 which is connected by means of the connecting leads 43 in series with a resistor 138 across the feedback capacitor 130.

The output from operation amplifier 127 at its terminal 131 is connected by the connection 29 through a resistor 139 to an input 140 of a second operational amplifier 141 which is connected, in conventional manner, as a summing circuit. Thus, a resistor 142 is connected between its output terminal 143 and its input terminal 140. The other input terminal 144 of the operation amplifier 141 is connected through a resistor 145 to ground. In order to improve the linearity of the circuit a resistor 146 in series with a capacitor 147 is connected to the amplifier 141, in known fashion. Positive voltage for the amplifier is obtained from bus 114 over connection 148 while negative voltage is obtained over connection 149 from the negative bus 113.

It was stated that operational amplifier 141 is connected as a summing circuit. One input is the signal received from the ramp generator over connection 29. The second input which is added thereto is obtained from the slider of a potentiometer 150 through a series resistor 151 connected to the input terminal 140. The potentiometer 150 is connected as part of a voltage divider in series with a fixed resistor 152, an adjustable resistor 153 and another fixed resistor 154 between the positive and negative buses 114 and 113. Potentiometer 150 provides a coarse adjustment while adjustable resistor 153 provides a fine adjustment for establishing, collectively, the base level or base frequency of the generator. This will be explained more fully hereinafter.

The signal appearing at the output of amplifier 141 is coupled by way of the connection 27 through a resistor 155 to the base electrode 156 of a transistor 157. The collector electrode 158 of transistor 157 is connected by a resistor 159 to the negative bus 113. The emitter electrode 160 of the transistor 157 is connected through a resistor 161 to the positive bus 114. A diode rectifier 162 and a zener diode 163 are connected in series between the base electrode 156 and ground poled as shown for limiting the negative travel of base electrode 156 relative to ground potential. A transistor 164 has its base electrode connected to the collector electrode 158 of transistor 157, as shown. The emitter electrode of transistor 164 is connected to the negative bus 113 while the collector electrode is connected through a resistor 165 in series with a resistor 166 to ground. The junction 167 between resistors 165 and 166 is connected through a capacitor 168 to the output lead 12.

Another transistor 169 has its collector electrode connected to the negative bus 113, its emitter electrode connected to the emitter electrode 160 and its base electrode connected through a resistor 170 and an adjustable resistor 171 to the positive bus 114. A capacitor 172 is connected in parallel with the resistors 170 and 171.

The junction between resistor 170 and capacitor 172 is connected to the collector electrode of a transistor 173. The emitter electrode of transistor 173 is connected through a fixed resistor 174 in series with an adjustable resistor 175 to the negative bus 113. The base electrode of transistor 173 is connected through a resistor 176 to the positive bus 114 and through the series arrangement of zener diode 177 and diode rectifier 178 to the negative bus 113.

The emitter electrode of a transistor 179 is connected to the positive bus 114 while its collector electrode is connected through a diode rectifier 180 to the junction between capacitor 172 and the collector electrode of transistor 173. The collector of transistor 179 is also connected through a resistor 181 to the negative bus 113. The base electrode of transistor 179 is connected to the input lead 13 from the monostable circuit 10.

The input to the circuit 10 is obtained from the connection 12. It passes through a diode rectifier 182 to a junction 183. Junction 183 is connected to the base electrode of a transistor 184 whose emitter electrode is connected to ground and whose collector electrode is connected through a resistor 185 to the negative bus 113. A resistor 186 also connects the negative bus to the junction 183. A forward connection from the collector of transistor 184 is made through capacitor 187 to the base electrode of a transistor 189.

The collector electrode of transistor 189 is connected through a resistor 192 to the positive bus 114. It is also connected through a parallel arrangement of capacitor 193 and resistor 194 to the junction 183. Finally, the emitter electrode of transistor 189 is connected at junction 195 to a resistor 196 which is connected to the negative bus 113. The junction 195 is connected through diode rectifier 197 to ground and to the emitter of a transistor 198. Three resistors 199, 200 and 201 are connected in series and form a voltage divider between the positive bus 114 and the collector electrode of transistor 198. The junction between resistors 199 and 200 is connected to the connection 13 which leads to the base electrode of transistor 179. The junction between resistors 200 and 201 is connected through a capacitor 202 to the output connection 15. The connection between resistor 201 and the collector electrode of transistor 198 is connected to the output connection 24.

The base electrode of transistor 198 is connected, as shown, directly to ground. Transistors 189 and 198 are connected, as will be understood, as another differential amplifier.

The junction 206 between capacitor 187 and diode 188 is connected to the collector electrode of a transistor 207. An adjustable resistor 208 in series with a fixed resistor 209 connects the emitter electrode of transistor 207 to the positive bus 114. The base electrode of transistor 207 is connected through a zener diode 210 and a diode rectifier 211 to the positive bus 114. The base electrode of transistor 207 is also connected through a resistor 212 to the negative bus 113.

Connection 24 leads through a resistor 213 to a capacitor 214 which has its opposite terminal connected to ground. The junction 215 between capacitor 214 and resistor 213 is connected to the emitter electrode of a unijunction transistor 216. One base contact of the transistor 216 is connected through the resistor 217 to the positive bus 114. The other base contact of the transistor 216 is connected through a resistor 218 to ground and through a capacitor 219 and diode rectifier 220 to the output connection 25. A resistor 221 is connected between ground and the junction between capacitor 219 and diode 220. A resistor 222 is connected between ground and the output connection 25.

The power supply for supplying the requisite voltages to the circuit of FIG. 2, as well as the circuits 14, 17, 20 and 21 of FIG. 1, are all conventional and need not be described in detail. The power amplifier should be arranged to provide a voltage output adjustable or selectable between the maximum and minimum voltages encountered in the subject power system.

OPERATION

When power is initially applied to the circuit, the monostable flip-flop 10 will tend to assume its stable condition with transistors 184 and 189 conducting. This causes the potential at the collector of transistor 184 to be near ground. Transistor 207 is also conducting due to the fixed and regulated voltage applied to its base electrode relative to its emitter electrode. The current from transistor 207 will flow through the base-to-emitter path of transistor 189 maintaining the latter in a conductive state. The arrangement is such that the potential at junction 206 is also near ground and the capacitor 187 has little or no charge. The feedback from the collector of transistor 189 through resistor 194 to the base of transistor 184 insures that the latter remains conducting. With transistor 189 conducting the voltage at junction 195, clamped by diode 197, maintains transistor 198 nonconductive. This follows from the fact that the base electrode of transistor 198 is maintained at ground potential.

With transistor 198 nonconductive, the potential at its collector electrode approaches the potential of the positive bus 114. This positive voltage is applied through connection 24 and resistor 213 as a charging voltage for capacitor 214. When the voltage on capacitor 214 reaches the triggering point of transistor 216, the latter will conduct discharging capacitor 214 through resistor 218 and developing a positive pulse in known manner which is applied through diode 220 to the input of circuit 10. It will be recognized that transistor 216 is coupled in a conventional relaxation oscillator circuit.

The positive pulse applied to the input of circuit 10 from the start pulse generator 23 is sufficient to render the transistor 184 momentarily nonconductive. As soon as this occurs, the potential at the collector electrode of transistor 184 drops toward that of the negative bus 113. Since there is no charge on capacitor 187 a similar negative going potential appears at junction 206. This drop in potential is applied to the base electrode of transistor 189 and is sufficient to cause transistor 189 to become nonconductive with the attendant rise in potential of its collector electrode. The latter rise in potential is applied regeneratively through the capacitor resistor network 193, 194 to the base electrode of transistor 184 maintaining the latter nonconductive. Thus, transistor 184 remains nonconducting until transistor 189 is again caused to conduct.

While the two transistors 184 and 189 are nonconducting, the capacitor 187 starts to charge through the constant current source provided by transistor 207. At the same time, when transistor 189 becomes nonconductive, conduction is established in transistor 198. At the moment that transistor 198 becomes conductive a substantial drop in voltage will occur at its collector electrode sufficient to prevent the voltage on capacitor 214 from reaching the firing point of unijunction transistor 216. So long as transistor 198 remains conductive the start pulse generator is prevented from operating. At the same time, a negative-going pulse is applied through capacitor 202 and connection 15 to the bistable flip-flop circuit 14 causing operation thereof. The broken line designated by the reference numeral 223 in FIG. 3A designates the moment in time when transistor 198 becomes conductive. After a predetermined period, in this case 8,000 microseconds, the voltage at junction 206 due to charging of capacitor 187 rises sufficiently toward ground potential to restore conduction through transistor 189. It should be apparent that this results in restoring conduction to transistor 184 while rendering transistor 198 nonconducting. Adjustment of the nonstable condition in circuit 10 can be effected by manipulating adjustable resistor 208.

When transistor 198 is conductive, during the nonstable condition of circuit 10, the voltage on connection 13, and therefore at the base electrode of the transistor 179, is sufficiently below that of the positive bus 114 to render the transistor 179 conductive. This establishes through diode 180 a low impedance path bypassing capacitor 172 and either discharging it or maintaining it discharged. Thus, the potential at the base electrode of transistor 169 will be close to that of the positive bus rendering the latter transistor nonconductive. In turn, this causes transistor 157 to be conductive. Hence, the voltage at the base electrode of transistor 164 is elevated above the negative bus sufficiently to render transistor 164 conductive. This causes the potential at junction 167 to assume a value between ground and the negative bus.

At the instant represented by the time line designated by the numeral 224 in FIG. 3A, the potential at the base electrode of the transistor 179 is raised to render the transistor nonconducting. This causes the capacitor 172 to start charging through the constant current source provided by transistor 173. Thus, as seen from line F in FIG. 3A the potential at the point F will start to go negative at the time designated by the dashed line 224. When the potential reaches the level represented by the horizontal line 225 in FIG. 3A, transistor 169 will suddenly conduct. This causes transistor 157 to be rendered nonconducting. In turn, transistor 164 is rendered nonconducting causing the potential at junction 167 to suddenly rise toward ground causing a positive pulse to be applied through connection 12 to the input to circuit 10.

The level 225 at which transistor 169 is rendered conductive is determined by the potential applied to the base electrode 156 of transistor 157 from the voltage driver 26. It will be recognized that transistors 169 and 157 are connected as a differential amplifier. It will be seen by comparing FIG. 3B with FIG. 3A that the less negative the triggering level the shorter the time interval before the transistor 169 is rendered conductive.

When transistor 169 becomes conductive an additional charging path is provided for capacitor 172 resulting in the negative spike 226 shown in FIG. 3A. At 227 on line A in FIG. 3A there is shown the positive pulse that is applied to diode 182 resulting in triggering of the flip-flop circuit 10 to its unstable condition in the same manner as previously explained in describing the response to the pulse from the start pulse generator. That is, the positive pulse at its input causes circuit 10 to change its condition such that transistor 198 becomes conducting causing transistor 179 to conduct and provide a discharge path for capacitor 172.

The discharge of capacitor 172 is represented by the portion 228 of the waveform F of FIG. 3A. At some instant in time represented by the dashed vertical line 229 in FIG. 3A, the voltage across the capacitor 172 will have decreased such that the potential at the base electrode of transistor 169 will have approached the positive bus sufficiently to render the transistor nonconducting. This will be reflected in conduction of transistor 157 along with conduction of transistor 164. Conduction of the latter causes a negative-going potential at junction 167 which is differentiated through capacitor 168 providing the negative spike shown in line A at 230 in FIG. 3A. However, the rectifier 182 prevents this negative spike from appearing at point B and disturbing the circuit 10. It should now be understood that circuit 10 proceeds through another cycle identical with the preceding and that the two circuits 10 and 11 will oscillate. The time constant of the resistor 213-capacitor 214 circuit is selected such that the start pulse generator remains inactive so long as transistor 198 is continually rendered conductive by reason of continued oscillation of circuits 10 and 11.

By suitable known means the bistable circuit 14, see FIG. 1, is caused to respond to only the negative going pulses received from circuit 10 over connection 15. This results in the output from the bistable circuit 14 being as represented on line D of FIG. 3A.

The symmetrical square wave produced at the output of circuit 14 is passed through narrow band-pass filter 17 to provide a sinusoidal wave of like frequency as shown on line E of FIG. 3A.

If it is assumed that the generator is to provide an output at 57 Hz., as contemplated by FIG. 3A, the time delay provided by circuit 11 should be 772 microseconds. Appropriate adjustments can be obtained with adjustable resistor 175.

It is assumed that the voltage supplied to the circuit 11 from the voltage driver 26 varies linearly with desired frequency. Therefore, in known manner the time interval provided by the circuit 11 must vary nonlinearly therewith. In order to adjust this nonlinearity, there is provided an adjustable shunt for capacitor 172 in the form of resistors 170 and 171. Adjustment of the latter is employed to obtain the desired relationship between time delay and input voltage.

FIG. 3B shows the general change in timing of the circuit for obtaining 61 Hz. operation. Here, the time interval during which capacitor 172 is charged should be 196 microseconds.

With no charge on capacitor 130 in the ramp generator, the voltage at its output terminal 131 will be at zero or ground potential. Therefore, the voltage at the output of the voltage driver 26 will depend upon the voltage appearing at the wiper of potentiometer 150. By adjusting potentiometer 150 and adjustable resistor 153 it is possible to select the base or starting output frequency of the generator. The range of adjustment in the embodiment being described is such that manipulation of the "COARSE" and "FINE" elements can vary the frequency from 57 Hz. to 61 Hz.

Assume as an example that the base frequency is 57 Hz. To start a frequency sweep, the switch lever 46 is manipulated to the "RAMP" position and held there. Switch 49 is closed causing the associated recording device to commence operation. Switch 48 is closed but since SCR 88 is nonconductive, the relay 51 remains deenergized. Switch 47 is closed applying voltage through the windings of relays 31 and 54 to the R-C timing circuit formed by resistor 71 and capacitor 72. After approximately 0.5 second the potential at the emitter 74 of transistor 68 will reach the firing point of the latter causing it to conduct and apply a positive pulse to the gate of SCR 57. When SCR 57 is rendered conductive it energizes relays 54 and 31. Upon energization of relay 54 the associated contacts 102 and 103 close and open, respectively. Closure of contact 102 causes a pulse to be applied at terminals 108 due to discharge of capacitor 107. This pulse can be employed to start a clock mechanism in known manner. Opening of contacts 103 at this time merely provides for removal of the shunt around capacitor 110 to permit it to become charged.

When relay 31 is energized it closes contacts 75 and 101. When contact 75 is closed it energizes the timing circuit provided by resistors 76, 77 and 78 in conjunction with capacitor 79. As mentioned above, this timing circuit is adjustable for a timing interval from about 1 to 60 seconds. At the end of such interval the potential will rise sufficiently to trigger the unijunction transistor 82 which acts as a trigger for the SCR 88. Upon conduction of the latter, the relay 51 is energized to open its contact 50 releasing the relays 54 and 31. This terminates the sweep interval.

Upon closure of contacts 101 voltage is applied across the resistors 119 and 120. The polarity of such voltage depends upon the position of reversing switch 121. With the switch thrown to the left as viewed in the drawings the slider of potentiometer 120 will have a positive voltage relative to ground applied thereto. With the switch 121 reversed in position the slider of potentiometer 120 will be supplied with a voltage which is negative with respect to ground.

In known manner, the voltage appearing at the slider of potentiometer 120 will be integrated at a rate determined by the choice of series resistor 122, 123 or 124. The resistors are so selected that resistor 122 provides a sweep voltage which will afford a generator output varying at the maximum rate of 0.1 Hz. per second. Resistor 123 establishes a maximum rate of 1.0 Hz. per second while resistor 124 establishes a maximum rate of 10 Hz. per second. The vernier adjusting potentiometer 120 can select a rate between zero and 100 percent of the maximum selected range. Thus, it is possible to select a rate varying uniformly from zero to 10 Hz. per second. The linearly varying output provided by the integrating circuit of ramp generator 28 is superimposed by connection 29 upon the voltage appearing at the slider of potentiometer 150. The sum of these two voltages appears at the output of the amplifier 141.

As well known, the capacitor 130 in the integrating circuit involving operational amplifier 127 will develop a charge during the integrating operation. When relay contacts 101 open at the end of a timing interval the charge then existing on capacitor 130 is maintained by the operational amplifier circuit. This maintains a fixed output for the generator system. It might be any selected frequency above or below the base frequency previously described. In order to return the circuit to the base operating frequency it is necessary to discharge capacitor 130 by manipulating the lever 46 to the "RESET" position, thereby closing switch 137.

When a timing interval is terminated upon firing of unijunction transistor 82 and SCR 88, the relays 54 and 31 are released. Release of relay 54 causes its contact 103 to reclose applying a pulse to the terminals 111 which can be connected to stop the external clock mechanism.

Sometimes it is desirable to determine the precise frequency at which a frequency sensitive test relay opens. This can be determined conveniently by arranging for the test relay to apply a pulse to the terminals 96 and 97 upon its operation. Thus, a slow frequency sweep can be initiated with the resistors 76 and 77 adjusted for a maximum timing interval. When the frequency is reached at which the test relay operates it will cause a pulse to be applied to the terminals 96 and 97 which functions to fire the transistor 82 independent of the voltage developed across capacitor 79. This stops the frequency sweep at that point. The precise frequency can then be ascertained by suitable known means.

Typical values for the various circuit elements are set forth in the following table wherein:

an *A* or *P* preceding a resistor reference numeral identifies an adjustable resistor or potentiometer, respectively; K=$x$ $10^3$; M=$x$ $10^6$; all resistance values are in ohms; and all capacitance values are in microfarads unless otherwise indicated.

The invention has been described with reference to a presently preferred embodiment thereof. It will be apparent to those skilled in the art that numerous changes can be made in the details thereof without departing from the true spirit of the invention as defined in the appended claims.

What is claimed is:

1. A signal generator comprising in combination means for generating a nonsinusoidal wave having a recognizable characteristic recurring at a controllable repetition rate, said means including a monostable circuit having an unstable state of substantially fixed duration, and a variable time delay circuit, said two circuits being coupled in a closed loop with the delayed output from the time delay circuit switching said monostable circuit to its unstable state and the output from said monostable circuit upon its return to its stable state initiating a delay cycle through said time delay circuit; means coupled to said time delay circuit for varying the time delay thereof and thereby said repetition rate linearly with time in a selectable direction at a selectable rate; and means coupled to said generating means for converting said nonsinusoidal wave to a sinusoidal wave having a frequency determined by said repetition rate.

2. A signal generator according to claim 1, wherein said means for converting to a sinusoidal wave comprises a bistable circuit coupled thereto and responsive to an output of said generating means for providing an alternating voltage wave having symmetrical positive and negative half cycles of equal duration and a frequency equal to one half of said controllable repetition rate, and wave-shaping means coupled to an output of said bistable circuit for producing a substantially Resistors

| No. | Value | No. | Value | No. | Value | No. | Value |
|---|---|---|---|---|---|---|---|
| 62 | 1 K | 109 | 47 K | P150 | 10 K | 185 | 15 K |
| 65 | 47 | 116 | 3.3 K | 151 | 100 K | 186 | 15 K |
| 66 | 100 | 118 | 3.3 K | 152 | 6.8 K | 192 | 3 K |
| 70 | 180 | A119 | 10 K | A153 | 1 K | 194 | 7.5 K |
| 71 | 10 K | P120 | 1 K | 154 | 2.7 K | 196 | 3.3 K |
| A76 | 250 K | 122 | 100 K | 155 | 3.9 K | 199 | 1 K |
| A77 | 25 K | 123 | 1 M | 159 | 1.5 K | 200 | 620 |
| 78 | 1 K | 124 | 10 M | 161 | 10 K | 201 | 2.7 K |
| 80 | 180 | 129 | 1 M | 165 | 2.2 K | A208 | 2.5 K |
| 84 | 100 | 132 | 1.5 K | 166 | 2.2 K | 209 | 11.75 K 1% |
| 85 | 47 | P136 | 20 K | 170 | 220 K | 212 | 2.2 K |
| 90 | 1 K | 138 | 10 K | A171 | 1 M | 213 | 47 K |
| 95 | 390 | 139 | 100 K | 174 | 4.12 K 1% | 217 | 270 |
| 104 | 47 K | 142 | 100 K | A175 | 2.5 K | 218 | 47 |
| 105 | 47 K | 145 | 15 K | 176 | 2.2 K | 221 | 10 K |
| 106 | 47 K | 146 | 390 | 181 | 47 K | 222 | 10 K |

Capacitors

| | | | | | | | |
|---|---|---|---|---|---|---|---|
| 63 | 0.01 | 107 | 0.1 | 168 | 0.003 | 202 | 0.002 |
| 72 | 50 | 110 | 0.1 | 172 | 0.1 | 214 | 10 |
| 79 | 50 | 130 | 0.3 | 187 | 0.5 | 219 | 0.005 |
| 86 | 0.01 | 147 | 0.0022 | 193 | 0.01 | | |

Transistors

| No. | Type | No. | Type | No. | Type | No. | Type |
|---|---|---|---|---|---|---|---|
| 68 | 2N1671B | 164 | 2N3391A | 179 | 2N3906 | 198 | 2N1305 |
| 82 | 2N1671B | 169 | 2N1305 | 184 | 2N3906 | 207 | 2N3906 |
| 157 | 2N1305 | 173 | 2N3391A | 189 | 2N1305 | 216 | 2N1671B |

Diodes

| | | | | | | | |
|---|---|---|---|---|---|---|---|
| 91 | 1N1692 | 162 | 1N914 | 180 | 1N914 | 211 | 1N1692 |
| 92 | 1N1696 | 163 | 1N704 | 182 | 1N914 | 220 | 1N914 |
| 93 | 1N914 | 177 | 1N714 | 197 | HP6002 | | |
| 117 | 1N705 | 178 | 1N1692 | 210 | 1N714 | | |

NOTE:

SCR's

| No. | Type | No. | Type |
|---|---|---|---|
| 57 | C106B | 88 | C106B |

Operational amplifiers

| No. | Model |
|---|---|
| 127 | ADO 29B Fairchild Instrument Co. |
| 141 | 3053/01 Burr-Brown Research Corp. |

undistorted sinusoidal voltage from said alternating voltage wave.

3. A signal generator according to claim 1, wherein a pulse generator is provided having an input for suppressing its operation and an output, the output of said pulse generator being coupled to an input of said monostable circuit, and an output of said monostable circuit being coupled to said input of the pulse generator whereby actuation of said monostable circuit by said pulse generator occurs in the absence of a signal from said time delay circuit to switch said monostable circuit.

4. A signal generator according to claim 1, wherein said means for varying the time delay comprises a source of voltage variable in a selectable direction at a selectable rate from a given datum level, and said variable time delay circuit is responsive to said voltage for varying its time delay.

5. A signal generator according to claim 4, wherein said source of voltage comprises an adjustable voltage ramp generator having an output, a source of adjustable voltage, and means coupled to both said ramp generator output and said source of adjustable voltage for combining the latter with the output from said ramp generator to provide a voltage which varies from an adjustable datum level.

6. A signal generator according to claim 4, wherein said means for varying said repetition rate comprises a control circuit coupled to said source of voltage for the control thereof, and said source of voltage includes a voltage ramp generator, said control circuit having means for both initiating and interrupting operation of said ramp generator from one voltage level to another, an adjustable interval timer for causing the interruption of the operation of said ramp generator a controllable time after initiation thereof, and means for initiating operation of said interval timer simultaneously with initiation of operation of said ramp generator.

7. A signal generator according to claim 6, wherein said control circuit comprises means for initiating the operation of an external recording device a given time interval prior to the simultaneous initiation of operation of both said ramp generator and said interval timer.

8. A signal generator according to claim 6, wherein said control circuit comprises means for receiving an external signal for causing interruption of the operation of said ramp generator prior to completion of a timing cycle by said interval timer.

9. A signal generator according to claim 6, wherein said means for converting to a sinusoidal wave comprises a bistable circuit coupled thereto and responsive to an output of said generating means for providing an alternating voltage wave having symmetrical positive and negative half cycles of equal duration and a frequency equal to one half of said controllable repetition rate, and wave-shaping means coupled to an output of said bistable circuit for producing a substantially undistorted sinusoidal voltage from said alternating voltage wave.

10. A signal generator according to claim 6, wherein said voltage ramp generator has an output and there is provided a source of adjustable voltage, and wherein means are coupled to both said ramp generator output and said source of adjustable voltage for combining the latter with the output from said ramp generator to provide a voltage which varies from an adjustable datum level.

11. A signal generator according to claim 10, wherein a pulse generator is provided having an input for suppressing its operation and an output, the output of said pulse generator being coupled to an input of said monostable circuit, and an output of said monostable circuit being coupled to said input of the pulse generator whereby actuation of said monostable circuit by said pulse generator occurs in the absence of a signal from said time delay circuit to switch said monostable circuit.

12. A signal generator according to claim 11, wherein said means for converting to a sinusoidal wave comprises a bistable circuit coupled thereto and responsive to an output of said generating means for providing an alternating voltage wave having symmetrical positive and negative half cycles of equal duration and a frequency equal to one half of said controllable repetition rate, and wave-shaping means coupled to an output of said bistable circuit for producing a substantially undistorted sinusoidal voltage from said alternating voltage wave.

13. A signal generator comprising in combination oscillatory circuit means for producing an asymmetric signal wave having a controllable repetition rate, means coupled to said oscillatory circuit means for varying said controllable repetition rate linearly with time in a selectable direction at a selectable rate, means coupled to said oscillatory circuit responsive to the asymmetric signal wave therefrom for producing a symmetric nonsinusoidal voltage wave having a repetition rate equal to one half of said controllable repetition rate, and wave-shaping means coupled to said last-mentioned means responsive to said voltage wave for providing a sinusoidal wave having a frequency equal to the repetition rate of said voltage wave.

14. A signal generator according to claim 18, wherein said oscillatory circuit means comprises means for generating a first portion of said asymmetric signal wave with a fixed time duration, and means coupled cooperatively to said last-mentioned means for generating a second portion of said asymmetric signal wave with a controllable time duration whereby the overall time duration of said first and second portions is controllable, said last-mentioned means being responsively coupled to said means for varying the controllable repetition rate.

15. A signal generator comprising in combination means for generating a nonsinusoidal wave having a recognizable characteristic recurring at a controllable repetition rate, an adjustable voltage ramp generator having an output, a source of adjustable voltage, means coupled to both said ramp generator output and said source of adjustable voltage for combining the latter with the output from said ramp generator to provide a voltage which varies from an adjustable datum level, means coupling said last mentioned voltage to said generating means for varying the repetition rate of said generating means linearly with time in a selectable direction at a selectable rate, and means coupled to said generating means for converting said nonsinusoidal wave to a sinusoidal wave having a frequency determined by said repetition rate.

16. A signal generator comprising in combination means for generating a nonsinusoidal wave having a recognizable characteristic recurring at a controllable repetition rate, a source of voltage including a voltage ramp generator, said voltage being variable in a selectable direction at a selectable rate from a given datum level, means coupling said voltage to said generating means for varying the repetition rate of said generating means linearly with time in a selectable direction at a selectable rate, a control circuit coupled to said source of voltage for the control thereof, said control circuit having means for both initiating and interrupting operation of said ramp generator from one voltage level to another, an adjustable interval timer for causing the interruption of the operation of said ramp generator a controllable time after initiation thereof, means for initiating operation of said interval time simultaneously with initiation of operation of said ramp generator, and means coupled to said generating means for converting said nonsinusoidal wave to a sinusoidal wave having a frequency determined by said repetition rate.

PO-1050
(5/69)

UNITED STATES PATENT OFFICE
CERTIFICATE OF CORRECTION

Patent No. 3,609,403 Dated September 28, 1971

Inventor(s) Edwin R. Eberle

It is certified that error appears in the above-identified patent and that said Letters Patent are hereby corrected as shown below:

Claim 14, line 1, after "claim" change "18" to --13--

Signed and sealed this 28th day of March 1972.

(SEAL)
Attest:

EDWARD M.FLETCHER,JR.
Attesting Officer

ROBERT GOTTSCHALK
Commissioner of Patents